US006294790B1

(12) United States Patent
Weinberger

(10) Patent No.: US 6,294,790 B1
(45) Date of Patent: Sep. 25, 2001

(54) SECONDARY ION GENERATOR DETECTOR FOR TIME-OF-FLIGHT MASS SPECTROMETRY

(75) Inventor: Scot R. Weinberger, Montara, CA (US)

(73) Assignee: Ciphergen Biosystems, Inc., Palo Alto, CA (US)

(*) Notice: Subject to any disclaimer, the term of this patent is extended or adjusted under 35 U.S.C. 154(b) by 0 days.

(21) Appl. No.: 09/158,747

(22) Filed: Sep. 22, 1998

Related U.S. Application Data

(60) Provisional application No. 60/059,828, filed on Sep. 23, 1997.

(51) Int. Cl.[7] ................................ G01K 1/08; H01J 3/14; H01J 3/26

(52) U.S. Cl. ................................ 250/397

(58) Field of Search ................................ 250/287, 329, 250/309, 281, 288, 396; 313/361.1; 328/232

(56) References Cited

U.S. PATENT DOCUMENTS

| | | | |
|---|---|---|---|
| 4,396,841 * | 8/1983 | Razin et al. | 250/396 R |
| 5,349,185 | 9/1994 | Mendenhall . | |
| 5,382,793 | 1/1995 | Weinberger et al. . | |
| 5,578,831 * | 11/1996 | Hershocovitch | 250/398 |
| 5,594,243 | 1/1997 | Weinberger et al. . | |
| 5,777,325 | 7/1998 | Weinberger et al. . | |

FOREIGN PATENT DOCUMENTS

| | | |
|---|---|---|
| 2 278 494 | 11/1994 | (GB) . |
| 2 318 679 | 4/1998 | (GB) . |

OTHER PUBLICATIONS

Bernhard Spengler et al., "The Detection Of Large Molecules In Matrix–assisted UV–laser Desorption" *Rapid Communications In Mass Spectrometry,* vol. 4, No., 9, pp. 301–305 (1990).

Raimund Kaufmann et al., "Secondary–ion Generation From Large keV Molecular Primary Ions Incident On A Stainless–steel Dynode" *Rapid Communications In Mass Spectrometry,* vol. 6, pp. 98–104 (1992).

Melvin A. Park et al., "An Inductive Detector For Time–of––Flight Mass Spectrometry" *Rapid Communications In Mass Spectrometry,* vol. 8, pp. 317–322 (1994).

W.–D. v. Fraunberg et al., "Collins–induced electron emission from surfaces in negative–ion time–of–flight mass spectrometry" *International Journal Of Mass Spectrometry and Ion Processes,* 133, pp. 211–219 (1994).

U. Bahr et al., "A charge detector for time–of–flight mass analysis of high mass ions produced by matrix–assisted laser desorption/ionization (MALDI)" *International Journal Of Mass Spectrometry and Ion Processes,* 153, pp. 9–21 (1996).

* cited by examiner

*Primary Examiner*—Jack Berman
*Assistant Examiner*—Johnnie L Smith, II
(74) *Attorney, Agent, or Firm*—Townsend and Townsend and Crew LLP

(57) ABSTRACT

An ion detector includes a secondary charged particle generator that generates secondary charged particles in response to primary ions that engage the secondary charged particle generator. The secondary charged particle generator has an electrostatic potential that repels the secondary charged particles toward an electro-emissive detector that generates electrons in response to primary ions and secondary charged particles that engage the electro-emissive detector The electro-emissive detector has a field that attracts the secondary charged particles. An anode is provided for detecting electrons generated by the electro-emissive detector and for generating a signal.

43 Claims, 9 Drawing Sheets

ENERGY AS A FUNCTION OF SPUTTER ANGLE

SECONDARY ION GENERATOR DETECTOR FOR TIME-OF-FLIGHT MASS SPECTROMETRY

This application is a continuation-in-part and claims the benefit of U.S. Provisional Patent Application No. 60/059,828 filed Sep. 23, 1997, the disclosure of which is incorporated by reference.

BACKGROUND OF THE INVENTION

The present invention relates in general to an ion detector, and more particularly to an ion detector for selective and enhanced detection of large mass to charge ratio ions.

Ions having large mass to charge ratio (m/z) (ions greater than approximately 12,000 daltons) typically may be generated via several different ionization techniques, including but not limited to: Plasma Desorption/Ionization (PDI), Matrix-assisted Laser Desorption/Ionization (MALDI), Surface-enhanced Laser Desorption/Ionization (SELDI), and Electrospray Ionization (ESI). The large m/z values for these ions are such that they are beyond the m/z dynamic range for most simple magnetic sector, electrostatic analyzer, magnetic sector hybrid, and quadrapole filter analyzers. Consequently, the analysis of these ions is typically performed using ion-trap, fourier transform ion cyclotron resonance, and time-of-flight (TOF) mass spectrometers. Because of their simplicity and economy, when compared to the other previously mentioned devices, TOF systems are most frequently used of analyzing such large ions.

In time-of-flight methods of mass spectrometry, charged (ionized) molecules are produced in a vacuum and accelerated by an electric field produced by an ion-optic assembly into a free-flight tube or drift time. The velocity to which the molecules may be accelerated is proportional to the square root of the accelerating potential, the square root of the charge of the molecule, and inversely proportional to the square root of the mass of the molecule. The charged molecules travel, i.e., "drift" down the TOF tube to a detector.

FIG. 1 generally illustrates a laser desorption ionization time-of-flight mass spectrometer. Briefly, the system comprises ion optics 20, which include a repeller 21, an extractor 22, and a ground plate 23. A mass filter 24 may be included. A detector 25 completes the system. A crystallized layer of sample/matrix mixture 30 is applied to the surface of a probe 19. The ion optics are then energized and a laser beam 31 is applied to sample mixture 30 to thereby release or desorb ions. Repeller 21 is held at a potential of, for example, 30 kV, extractor 22 is held at a potential of, for example, 15 kV, while groundplate 23 is held at ground potential. An electric field is set up due to the potential difference between repeller 21, extractor 22, and groundplate 23, and thereby accelerates desorbed ions through the ion optics. Among the desorbed ions are matrix molecules and analyte molecules. Since the analyte molecules are the molecules of interest, mass filter 24 may be utilized to filter out the matrix molecules. Mass filter 24 typically comprises an entry plate and exit plate (not shown) and deflector. Finally, the ions reach detector 25 and the time-of-flight in traveling to the detector is utilized to calculate a mass to charge ratio. Since laser beam 31 passes through a beam splitter 27 such that a portion of laser beam 31 activates a trigger photo diode 32, the time the process started is known.

A laser desorption/ionization time-of-flight mass spectrometer (LDIMS), as depicted in FIG. 1, could be used to perform MALDI or SELDI analysis.

For MALDI analysis, samples are prepared as solid-state co-crystals or thin films by mixing them with an energy absorbing compound or colloid (the matrix) in the liquid phase, and ultimately drying the solution to the solid state upon the surface of an inert probe. In SELDI analysis, the probe or sample presenting surface plays an active role in the ionization, purification, selection, characterization or modification of the applied sample. In some cases an energy absorbing molecule (EAM) is an integral component of the sample presenting surface. In other cases, an energy absorbing molecule is added after the SELDI surface has completed its required interaction with the sample. Regardless of EAM application strategy, the probe contents are allowed to dry to the solid state prior to introduction into the LDIMS.

The output of detector 25 is integrated at some duty cycle as a function of time with respect to the time of the irradiating laser pulse 31 as sensed by the trigger photo diode 32. The molecular weight of an ion is then determined using the time-of-flight expression: $m/z=A\,(Tf-To)^2$ where: M/Z is the ions determined mass to charge ratio, Tf is the total flight time of the ion, To is the time interval that exists between the triggering of the timing device and acceleration of resultant ions and A is a constant that accounts for ion total kinetic energy and total flight distance. The values for A and To are empirically determined by comparing the experimental Tf flight number of well characterized analytes with their respective m/z. The determination of A and To calibrates the instrument and allows for more accurate m/z assignment.

During MALDI and SELDI analysis, a significant population of ions may be generated as a direct consequence of the use of matrix or EAM, respectively. These ions are transmitted down to the detector's conversion surface along with those ions created from the analytes of interest. In ESI analysis, a large number of ions are created from the solvents which make up the carrier solution. As was the case for SELDI and MALDI, these ions are also transmitted down to the detector's conversion surface. In all of these ionization techniques, it is not uncommon for these "unwanted ions" to be a major component of the entire ion current, far exceeding the number of analyte ions that are of interest. Since the ion transmission time period for a single LDIMS scan is rarely greater than 500 microseconds, detector electrons consumed during the conversion/gain process are usually not replaced during this rapid duty cycle. The result is charge depletion and field collapse to a level that seriously compromises detector gain.

In order to avoid field collapse and attendant gain reduction, presently used devices provide ways by which unwanted ions are prevented from striking the ion detector or ways by which detector gain voltage is rapidly switched on after the last unwanted ions strike the conversion surface. The former is accomplished by employing the additional set of ion optic elements that function as a mass gate or mass filter. The latter is accomplished through the use of high speed switching devices such as field effect transistors. Both of these methods add complexity and cost to TOFMS instruments. Because the gain rise time of a detector conversion surface is often several microseconds, the rapid switching technique does not allow for steep cut-off ranges, creating the possibility of inadequate gain during the initial phase of its duty cycle.

Ion detection in TOF mass spectrometry is typically achieved with the use of electro-emissive detectors such as electron multipliers (EMP) or microchannel plates (MCP). Both of these devices function by converting primary incident charged particles into a cascade of secondary, tertiary, quaternary, etc. electrons. The probability of secondary electrons being generated by the impact of a single incident charged particle can be taken to be the ion-to-electron conversion efficiency of this charged particle (or more simply, the conversion efficiency). The total electron yield for cascading events when compared to the total number of incident charged particles is typically described as the detector gain. Because generally the overall response time of MCPs is far superior to that of EMPs, MCPs are the preferred electro-emissive detector for enhancing m/z resolving power. However, EMPs function well for detecting ion populations of disbursed kinetic energies, where rapid response time and broad frequency band width are not necessary.

The conversion efficiency of large ions is known to be two to three orders of magnitude less than that of smaller ions. To compensate for this effect, secondary ion generators (SIG) have been used. Such a secondary ion generator is disclosed in U.S. Pat. Nos. 5,382,793, and 5,594,243, the contents of which is incorporated herein by reference for all purposes. With such secondary ion generators, when a primary incident ion strikes the surface of a secondary ion generator held at ground potential, secondary ions are created via the fragmentation of primary incident ions as well as the sputtering of what was thought to be a significant population of secondary metal ions from the SIG surface. FIG. 2*a* depicts an MCP detector utilizing a discrete SIG. In this arrangement, the SIG is a low transmission grid that is generally composed of copper or some copper alloy. It was postulated that incident ions (M+H)+strike the SIG resulting in their fragmentation into a series of product ions and neutrals as well as the release of electrons and SIG structural ions (in this example, Cu+). SIG product ions are post accelerated to the MCP conversion surface through the use of moderately strong electrical fields (~−1 to −5 kV/cm). Since the m/z of the SIG product ions are typically far less than that for large primary incident ions, ion conversion efficiency is increased and sensitivity can be improved by two—three orders of magnitude.

Recent work has led to the discovery that the majority of sputtered products from such secondary ion generators are actually emitted electrons and metal neutrals, and not a predominance of secondary metal ions as previously believed. Furthermore, it has been discovered that a significant population of these sputtered products are emitted in retrograde fashion with respect to the original direction of incident ion trajectory. FIG. 2*c* depicts this process.

It has also been discovered that biasing the SIG to some negative potential, such as −50 to −3,000 volts, improved the collision probability of primary ions by suppressing any strong "field punch," penetration of an electric field from one region into another, created by the underlying MCP conversion surface held at negative potentials greater than −2 KV. Such field punch provides an accelerating field which preferentially directs incident ions away from the SIG grid wires and into the space between them thus defeating the purpose of the SIG.

It has also been demonstrated that biasing the SIG to some negative potential promotes the emission of electrons. The emission of sputtered neutral products are not effected during such biasing. Since the negatively biased SIG is typically mounted upon an MCP detector whose impact surface is held at some high negative potential exceeding that which is employed in the SIG biasing, both forward and back sputtered electrons are accelerated backwards in retrograde fashion. Consequently, these electrons are driven through the cloud of sputtered neutrals, thus ionizing them to sputtered metal ions through the mechanism of electron impact ionization. In this manner, ion-converted, back sputtered neutrals can now be accelerated by the field of the negatively biased SIG to pass through the SIG and strike the surface of the MCP thereby creating additional detection signals which enhances the sensitivity for high molecular weight ions.

In addition to ionizing sputtered neutrals, such retrograde electrons promote fragmentation of non incident and soon to be incident parent ions through the mechanism of electron impact. Since the m/z of these fragment ions are less than that for their large, primary ions, ion conversion efficiency is further increased.

Since far more sputtered metal-neutral products are formed than sputtered metal ions, and because 2 significant population of these products are released in retrograde or back sputtered fashion, and because emitted electrons can be used to fragment primary ions or convert sputtered neutral products to forms more amenable to detection, and further because field penetration through a ground potential SIG reduces primary ion impact, prior art SIG approaches, as depicted in FIG. 2*a*, do not make optimum use of this secondary ion generation process. Significant improvement in the detection of high molecular weight ions can thus be achieved by negatively biasing the surface of the SIG. Because a biased SIG is more successful in generating charged, detectable products, such a configuration will now be referred to as a secondary charged particle generator (SCPG).

SIG or SCPG fragmentation, ionization, and sputter products are generated at a plurality of times, masses, and energies, and thus, many of these products do not propel uniformly forward and therefore do not strike the MCP conversion surface at the same time as their non-incident, parent ion counterparts. Therefore, discrete SCPG or SIG devices introduce ion conversion time spread and can result in an attenuation of m/z resolution. Such ion conversion time spread can be tolerated if it is insignificant when compared to other existing time spreads created in the measuring process. The initial ion energy spread of large ions are beyond the energy focusing capability of present SELDI and MALDI TOF technology, and is the limiting factor in m/z resolution. Consequently, a discrete SCPG or SIG can be used to increase ion conversion efficiency and detection sensitivity without significant reduction of m/z resolving power. However, for smaller ions, significant reduction of m/z resolving power has been demonstrated when using a discrete SCPG or SIG in these applications.

It has been demonstrated that the placement of an additional grid electrode (a differential acceleration grid, DAG) between the SCPG and MCP can be used to mitigate the time of flight disparity between SCPG generated products and non-incident parent ions thus improving mass resolving power. Such an arrangement is depicted in FIG. 2*c*. SCPG created sputter products are generally much lower in MW than their incident ion or fragmentation ion counterparts. Consequently, acceleration produced within the field that exists between the SCPG and MCP often propels sputtered ion products past these other ions. The result can range from a front end distorted detection signal to the resolution of early arriving ion populations, depending on the mass of the incident ion. Ions with MW less than 50 kDa can typically produce two or more measurable signals while heavier ions tend to have a single, front end distorted signal.

Such distortion of resolution could be avoided by placing a low acceleration potential between the SCPG and the MCP, however doing so will greatly reduce the final energy of sputtered and fragmented SCPG products, thus reducing their electron conversion efficiencies at the detector surface. Additionally, the use of high strength post acceleration fields have also demonstrated improvements in non-incident parent ion detection conversion efficiency, further augmenting sensitivity for large mw ions. Thus, it is advantageous to have strong acceleration fields between the SCPG and MCP surface.

A preferred method to eliminate this problem involves the use of a DAG. An electrical potential is placed upon the DAG which establishes a field between the SCPG and the DAG which is significantly lower than that which would normally exist between the SCPG and an MCP. In this manner sputtered product ions are not greatly accelerated. Because the initial energies of these sputtered product ions are low (measured to be less than 20 eV), they move slowly through this region. Non incident parent ions and incident ions without significant energy loss, continue to move at high velocities through this region, passing the sputtered product ions. Once sputtered product ions pass the DAG they are then accelerated by a strong field existing between the DAG and MCP surfaces. The DAG potential is selected such that further acceleration of sputtered ion and parent ion populations occurs in a manner so that sputtered product ions "catch up" with the parent ion population at the point of impact upon the MCP surface. In this manner, time spread is minimized and resolution is improved.

Because the degree of differential acceleration required to time compensate parent and sputtered product ions is mass dependent, the potential of the DAG must vary as the mass of the -incident ion varies. This can be achieved by the use of distinct DC DAG potentials so that scans are segmentally performed at different target masses. However, this technique is somewhat cumbersome. A preferred solution is one in which the DAG is held at some constant DC potential and is capacitively coupled to an AC signal whose amplitude is time dependent. The time-dependent amplitude change of this AC signal is synchronized with the time of parent ion arrival at the SCPG, so that the appropriate DAG potential is present during a given mw analysis time.

SUMMARY OF THE INVENTION

In accordance with the present invention, one embodiment of a detector which addresses the shortcomings of the prior art is presented, a forward trajectory ion detector. A forward trajectory ion detector comprises a field retaining grid which permits ions to enter and strike a negatively biased SCPG grid thus creating fragmentation of primary ions and generating secondary electrons, sputtered neutrals and sputtered ions from the SCPG surface. The SCPG preferably has an electrostatic potential which promotes electron emission and electron ejection into sputtered neutral products and parent ions. Electron impact with sputtered neutrals creates additional sputtered ions while electron impact with parent ions promotes further fragmentation. Non-incident parent ions, incident parent ions, and SCPG products are then accelerated to the surface of an electro-emissive detector, such as a microchannel plate, for ultimate signal generation.

In one embodiment, the field retaining grid is removed and replaced with a field retaining tube which allows for control of the biased SCPG electrical field so that it does not deleteriously effect the trajectory of incident ions during their free flight towards the detector assembly.

In another embodiment, the SCPG grid is coated with a film comprised of inorganic, aromatic, conjugated pi systems, and/or organo-metallic polymer so that parent ion collision more efficiently releases secondary electrons and/or charged ions.

In another embodiment, a DAG is placed between the SCPG and electro-emissive detector surface so that the attendant time spread created by post acceleration of intact parent ions and SCPG products does not excessively reduce detector mass resolving power.

In accordance with the present invention, a second configuration of an ion detector which addresses the shortcomings of the prior art is presented, the reverse trajectory ion detector. A reverse trajectory ion detector comprises an ion detector comprises an electrically shielded transporter that directs movement of primary ions along a primary direction of travel to a secondary charged particle generator. The secondary charged particle generator generates secondary charged particles in response to primary ions from the transporter that engage the secondary charged particle generator. The secondary charged particle generator preferably has an electrostatic potential that repels the secondary charged particles. The ion detector further comprises at least one electro-emissive detector that generates electrons in response to secondary charged particles from the secondary charged particle generator and rebounding primary ion fragments that engage the electro-emissive detector. The electro-emissive detector is positioned to receive the secondary charged particles and rebounding primary ion fragments along a secondary direction of travel that is at least partially retrograde to the primary direction of travel. The ion detector also comprises an apparatus for detecting electrons generated by the electro-emissive detector and for generating a signal.

In one embodiment, the secondary charged particle generator is a solid foil comprised of a metal or metal alloy having a high sputter efficiency. The SCPG may also be coated with a film comprised of inorganic, aromatic, conjugated pi systems, and/or organometallic polymer so that parent ion collision more efficiently releases secondary electrons and/or charged ions. Therefore, all ions of interest will strike the secondary charged particle generator creating secondary charged particles. Because the secondary charged particle generator may have an electrostatic potential that repels secondary charged particles, the flow and direction of the secondary charged particles can be controlled and the number of secondary charged particles engaging the electro-emissive detector is greatly improved when compared to the prior art. Therefore, the reverse trajectory ion detector of the present invention is extremely efficient.

In one embodiment, the reverse trajectory ion detector includes a focusing element that aids in disbursal directing the repelled secondary charged particles and incident primary ions to strike the electro-emissive detector. This increases ion detection sensitivity by preventing sputtered products from leaving the detector through the transporter. It also decreases electro-emissive ion current density thereby avoiding saturation.

The reverse trajectory ion detector may also include a field retaining entrance grid between the secondary charged particle generator and the electro-emissive detector. The field retaining entrance grid prohibits primary ion and secondary product flight trajectory perturbations due to stray electrical fields created by the surface of the electro-emissive detector.

Accordingly, the two configurations of the present invention provide an improved ion detector for the detection of high molecular weight ions by improving the secondary ion generation and collection process. The forward trajectory ion detector provides improved performance over prior SCPG or SIG schemes through the use of: voltage biasing of SCPG surfaces; secondary charge particle promoting polymeric coatings upon SCPG surfaces; and diminished time spread performance created by a capacitively or directly coupled DAG. The reverse trajectory ion detector provides improved performance over prior schemes through the use of a contiguous, generally solid surface which acts as a SCPG. Because all parent ions strike this surface, the secondary particle generation is significantly greater than that created by a discrete, grid secondary ion or secondary charged particle generators. The result in both cases is a marked increase in sensitivity for high m/z ions when compared to other secondary ion generation means.

Other features and advantages of the present invention will be understood upon reading and understanding the detailed description of the preferred exemplary embodiments, found herein below, in conjunction with reference to the drawings, in which like numerals represent like elements.

DESCRIPTION OF THE SPECIFIC EMBODIMENTS

Figure 3:
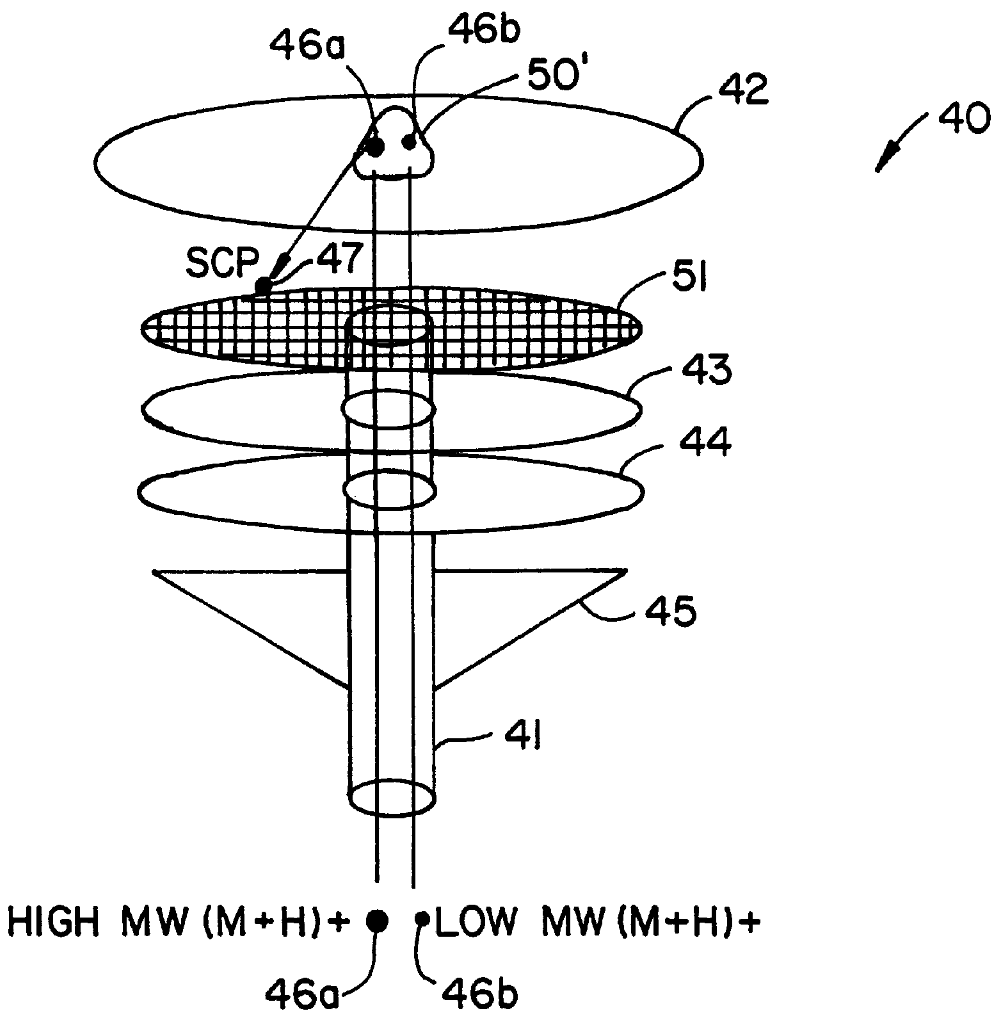
FIG. 3 is a schematic view of a reverse trajectory secondary ion generator in accordance with the present invention, and including a concave focusing element.

A reverse trajectory ion detector 41 in accordance with the present invention is schematically illustrated in FIG. 3. Ion detector 40 comprises a shielded transit tube 41, a secondary charged particle generator 42, an electro-emissive detector comprising a first microchannel plate 43, a second microchannel plate 44, and a detector anode 45. In a preferred embodiment, the microchannel plates and detector anode are annular and therefore surround the shielded transit tube. As will become apparent later herein to those skilled in the art, this is not a required arrangement. However, such an arrangement is preferable since it minimizes ion conversion time spread.

Transit tube 41 must be electrically shielded so that electric fields surrounding the transit tube do not interfere with the travel of the primary ions traveling therein. Similarly, transit tube 41 must be held at ground potential or free flight potential. Transit tube 41 may be comprised of material such as, for example, glass, plastic, polymer, that is coated with an electro-conductive material such as, for example, titanium, gold, copper. Alternatively, transit tube 41 may be a solid metal tube or a cylindrical grid.

Secondary charged particle generator (SCPG) 42 preferably has an engagement surface comprised of a material having a high sputter efficiency or high sputter potential. High sputter efficiency refers to the material's tendency to sputter off secondary charged particles such as ions, electrons and protons, and neutrals when struck by another particle, i.e. the higher the sputter efficiency, the more secondary charged particles released when the material is struck by another particle. (Sputter potential generally corresponds to heat of sublimation.) Accordingly, SCPG 42 preferably has a solid surface of foil on an engagement side composed of metals with high sputter efficiency, such as, but not limited to, Cu, Au, Ag, Cd, Zn, Pb and alloy mixtures of these metals. Preferably the foil is non-permeable. Alternatively, SCPG 42 may be a solid block of metal having a high sputter efficiency, such as, but not limited to, Cu, Au, Ag, Cd, Zn, Pb and alloy mixtures of these metals, or a solid support that is coated with a metal of high sputter efficiency. A solid support or foil SCPG may be alternatively coated with an ionic crystalline or polymeric coating, such as but not limited to aromatic, substituted pi system, or conjugated organometallic polymers, of high sputter potential. SCPG 42 could be a skeleton comprised of an inert material and coated along at least an engagement side with a metal, inorganic, or organic polymeric coating that provides electrical conductivity and has sputtering capabilities. SCPG 42 may also be a low transmission grid (less than 60% transmission) or a high transmission grid. SCPG 42 is generally planer. Finally, SCPG 42 is preferably held at a potential in the range of, for example, +5 to +10 kV to thereby repel sputtered charged particles.

First and second microchannel plates 43 and 44 are provided as an electro-emissive detector in the embodiment illustrated in FIG. 3. Electro-emissive detector, as used herein, refers to a device that emits electrons for later detection and signal generation such as, for example, one or more microchannel plates, electron multipliers, hybrids of the two and the like. Such plates are well-known in the art. Briefly, each plate consists of a plurality of microscopic tubes that are held in an electric field. Ion collisions with the wall of these tubes incite the release of electrons. These electrons then cascade down these tubes releasing more electrons. This results in a conversion of electrical charge from ions to electrons with a simultaneous increase in total charge. These electrons are then utilized by electronic circuitry to produce a signal. In the present embodiment, detector anode 45 is provided for detecting the electrons and producing a signal.

Microchannel plates 43, 44 are preferably held at a potential in the range of, for example, −2 to −5 kV and −1 to −4 kV, respectively. This aids in propagation of electrons to anode 25, which is preferably held at virtual ground, due to the decreasing negative potential. If a field retaining entrance grid 51, described in more detail below, is not utilized, than an electrical field with respect to the secondary charged particle generator is created to thereby aid in attracting secondary charged particles.

Accordingly, the general operation of the reverse trajectory ion detector 40 involves primary ions 46 traveling through shielded ion transit tube 41, exiting therefrom and striking or engaging secondary charged particle generator 42. Because the SCPG is preferably solid, virtually all of the primary ions strike it. The secondary charged particle generator 42 then releases or "sputters" secondary charged particles 47, generally in the form of metal ions metal neutrals, or electrons (and possibly protons depending on the embodiment), that are repelled from SCPG 42 due to the electric potential of SCPG 42. The charged particles, along with rebounding incident primary ions that have fragmented into product ions and neutrals, travel to the first microchannel plate 43, striking it at the aforementioned channels to thereby start the cascading electrons. The charged particles are accelerated to microchannel plate 43 due to the difference in potential between SCPG 42 and MCP 43.

Electrons released from first microchannel plate 43 then strike second microchannel plate 44 to begin cascading and releasing electrons within the second microchannel plate's tubes. Electrons released from the second microchannel plate are then detected by detector anode 45. Thus, based on the time involved, starting with the desorption of the primary ions, until the detecting of the electrons at detector anode 45, the mass of the primary ion colliding with SCPG 42 can be calculated.

As stated previously, it should be apparent to those skilled in the art that microchannel plates 43 and 44, as well as detector anode 45, do not need to surround transit tube 41. They merely need to be arranged such that they are in a position to receive repelled secondary charged particles traveling in a direction that is at least partially retrograde to the direction of travel of the primary ions in the transit tube. The annular arrangement is the preferred arrangement since it does minimize ion conversion time spread.

Furthermore, only one MCP is required or more than two may be used depending on the sensitivity required. Also, as stated previously, other electro-emissive detectors, such as electron multipliers, may be used instead of MCPs. Alternatively, electron multipliers or the like may be used in conjunction with one or more MCPs in a hybrid arrangement.

As can be further seen in FIG. 3, in a preferred embodiment, a focusing element 50 is provided. In the embodiment illustrated in FIG. 3, focusing element 50 is a concave portion centered within SCPG 42 opposite the shielded ion transit tube. The concave focusing element 50 causes the electric field along the surface of SCPG 42 created by the potential to bend. Therefore, the sputtered resulting secondary charged particles are disbursely directed to strike the first microchannel plate 43. Most of the large primary ions will rebound back into transit tube 41 since the electrical field will not be strong enough to "move" the large ions. Smaller fragmented ion products may be directed by the electric field to strike the first microchannel plate 43. Accordingly, focusing element 50 functions to spread out the created secondary charged particles to strike a distributed area of the microchannel plate conversion surface. This increases ion detection sensitivity by preventing sputtered products from leaving the detector through the transit tube as well as decreasing microchannel plate ion current density thereby avoiding saturation.

Figure 4:
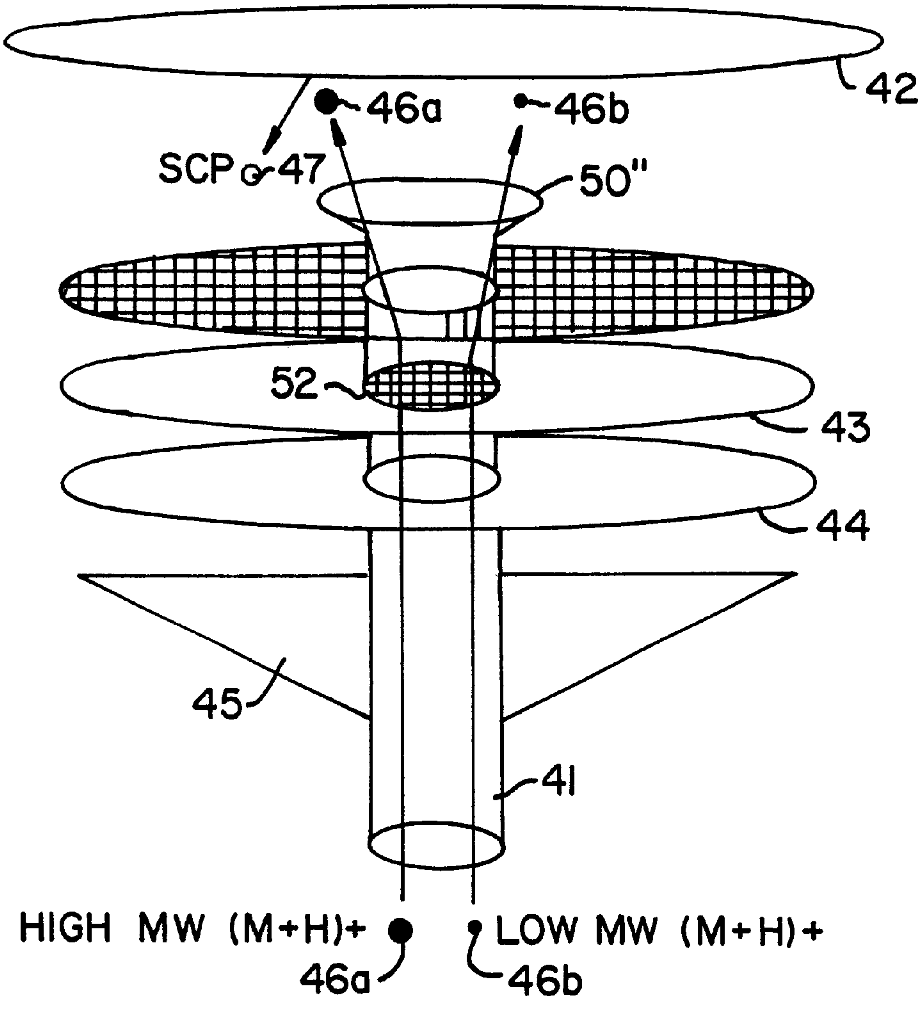
FIG. 4 is a schematic view of a reverse trajectory secondary ion generator in accordance with the present invention, and including a cone ion lens.

In FIG. 4, focusing element 50' is in the form of a cone ion lens connected to the exit of shielded transit tube 41. Furthermore, FIG. 4 includes a field-retaining entrance grid 51 surrounding the transit tube below cone ion lens 50' and a lens ground grid 52 within transit tube 41 below the field retaining entrance grid.

In the embodiment of FIG. 4, SCPG 42 is kept at a potential in the range of, for example, +5 kV to +10 kV and the resulting ion acceleration field created between SCPG 42 and the field retaining entrance grid 51 strongly penetrates the cone ion lens, terminating at lens ground grid 52. Such field penetration creates a defocusing effect, diffusely distributing primary ions to be incident throughout the surface of SCPG 42. The peripheral regions of this ion acceleration filed remain flat, strongly directing the sputtered products through the field retaining grid and onto the conversion surface of MCP 43. Accordingly, in this embodiment, primary ions are disbursed to increase ion detection sensitivity.

FIG. 3 also illustrates a field retaining entrance grid 51 and therefore SCPG 42 is kept at a potential in the range of, for example, +5 kV to +10 kV. This grid is optional and may be utilized to define or adjust the acceleration potential between SCPG 42 and first MCP 43 so as to create a degree of sputtered ion focusing so that a maximum amount of disbursed sputtered product strikes the conversion surface of first MCP 43. In the FIG. 3 embodiment, rebound primary ions and primary product ions with energies greater than 20 eV will most likely rebound from SCPG 42 and pass through the transit tube. Thus, they will never strike the conversion surface of first MCP 43, and thus the field retaining entrance grid aids in decreasing any created time spread due to differences in rebound product and sputter product energies.

Furthermore, field retaining entrance grid 51 aids in eliminating fringes within the electric field and maintaining field lines between SCPG 4 and first MCP 43. The field retaining entrance grid provides a more regular acceleration field between SCPG 42 and MCP 43.

Figure 5:
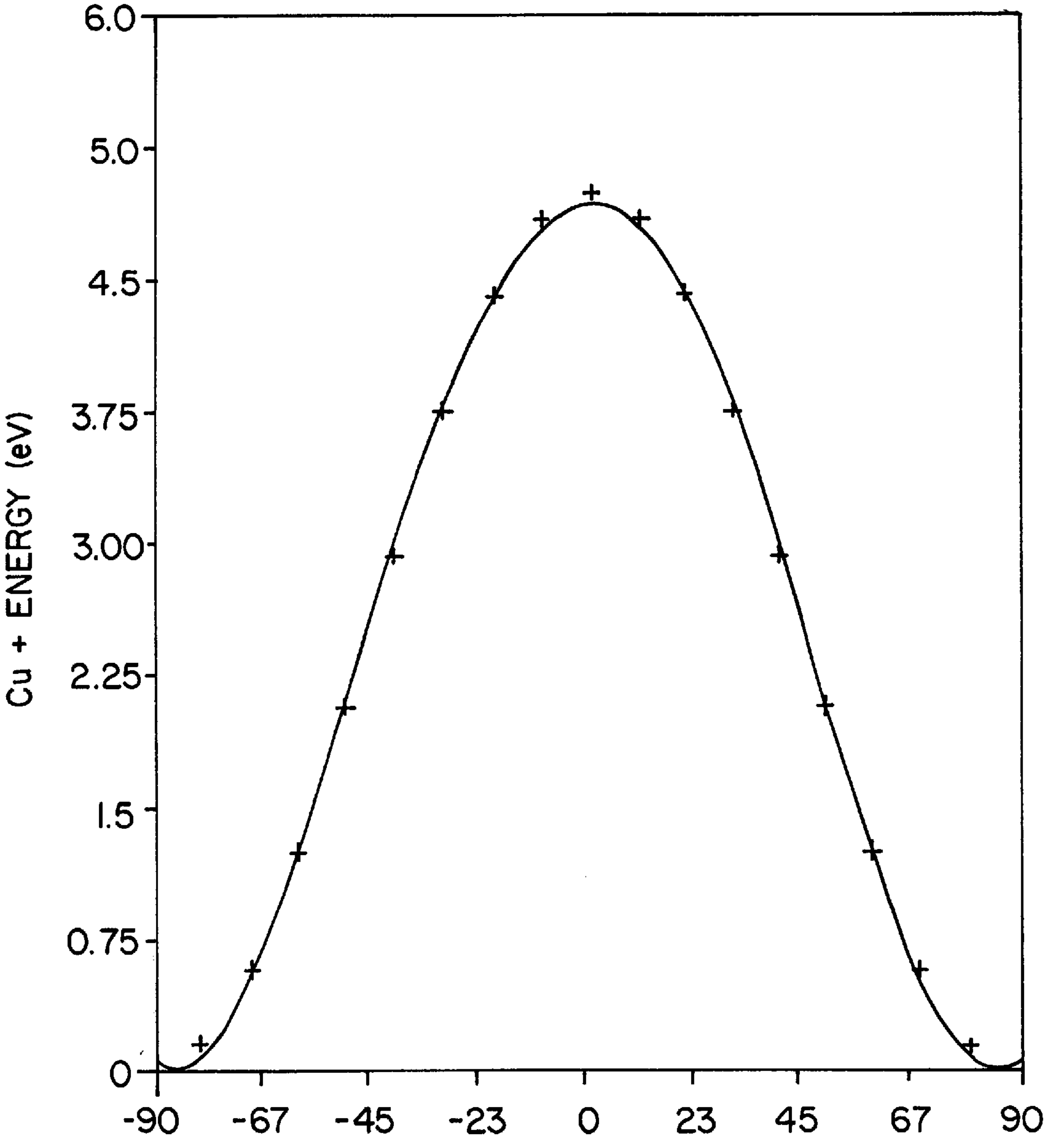
FIG. 5 is a graph illustrating secondary charged particle energy as a function of sputter angle.

The energy of a sputtered product released at zero degrees with respect to the normal of the foil surface is taken to be no greater than 500 eV for a 30 keV incident particle. It is expected that the energy distribution of sputtered products will follow a cosine squared relationship with respect to release angle. FIG. 5 illustrates an energy profile for Cu+ sputtered ions created over a +/−90 degree normal distribution. The energy of rebound incident ions and incident product ions is expected to be several hundred to several thousand eV. As can be clearly seen in FIG. 5, zero degree angle sputtered products have the greatest energy. Sputtered products tending to go "more to the side" or having angles closer to ninety degrees have less energy. Therefore, these weak ions can more easily be directed to hit MCP 43 by the electrical field.

Because a solid SCPG is used in lieu of a low transmission grid in the reverse trajectory ion detector, the collision frequency for a given ion population with the SCPG is taken to be greater than that demonstrated with grids. Incident particle collision with SCPG or SIG grids, as described in prior art applications, often results in back scattered products, and thus a significant amount of sputtered product never gets converted. Because the ion collision frequency of a solid SCPG is higher than that of its SCPG or SIG grid counterpart, and because all of the sputtered product from a solid SCPG remains in the conversion acceleration field, the solid SCPG design is substantially more sensitive that grid approaches.

The ion detector 40 may be configured for negative secondary charged particle detection. In this instance a negative potential in the range of, for example, −5 to −10 kV, is applied to SCPG 42 while increasing positive potentials, for example in the range of +100 V to +5 kV and +500 V to +6 kV, are respectively applied to the consecutive MCP detectors 43 and 44.

A forward trajectory ion detector 60 in accordance with the present invention is schematically illustrated in FIGS. **2*b* and 2*c*. Ion detector 60 comprises a field retaining grid 61, a grid-type secondary charged particle generator 62, a differential acceleration grid 63, an electro-emissive detector comprising a first microchannel plate 43, a second microchannel plate 44, and a detector anode 45. As opposed to the reverse trajectory ion detector, MCP plates 43 & 44 as well as detector anode 45** are solid assemblies without an annular arrangement.

Field retaining grid 61 is preferably a high transmission grid (80% transmission or greater) composed of a material with low sputter potential, such as but not limited to Ni, stainless steel, or other non ferromagnetic alloys. High transmission and low sputter potential is desired to minimize fragmentation. of parent, incident ions or the creation of secondary products as incident ions pass through field retaining grid 61.

Figure 1:
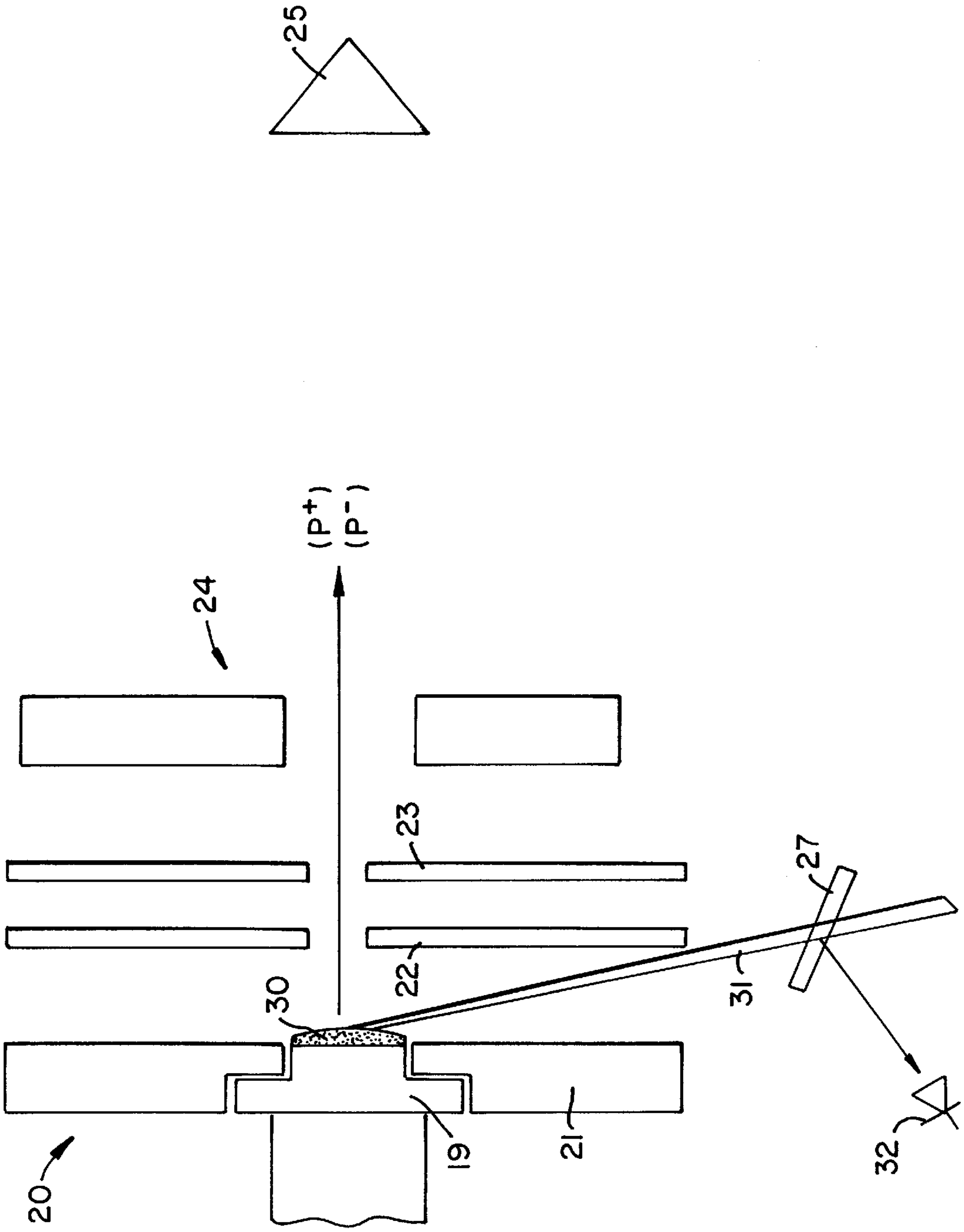
FIG. 1 is a schematic view of a laser desorption ionization time-of-flight mass spectrometer.
Figure 2A:
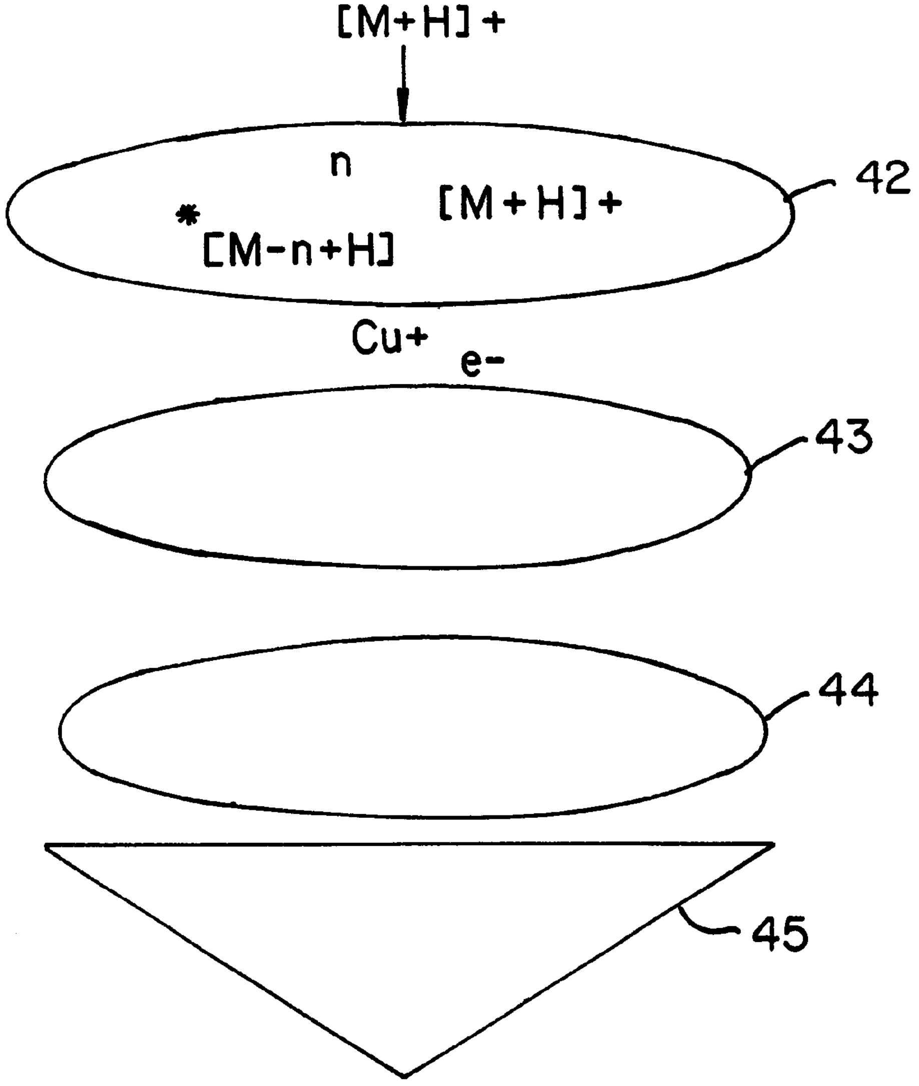
FIG. 2*a* is a schematic view of a discrete, grid-type secondary ion detector.
Figure 2B:
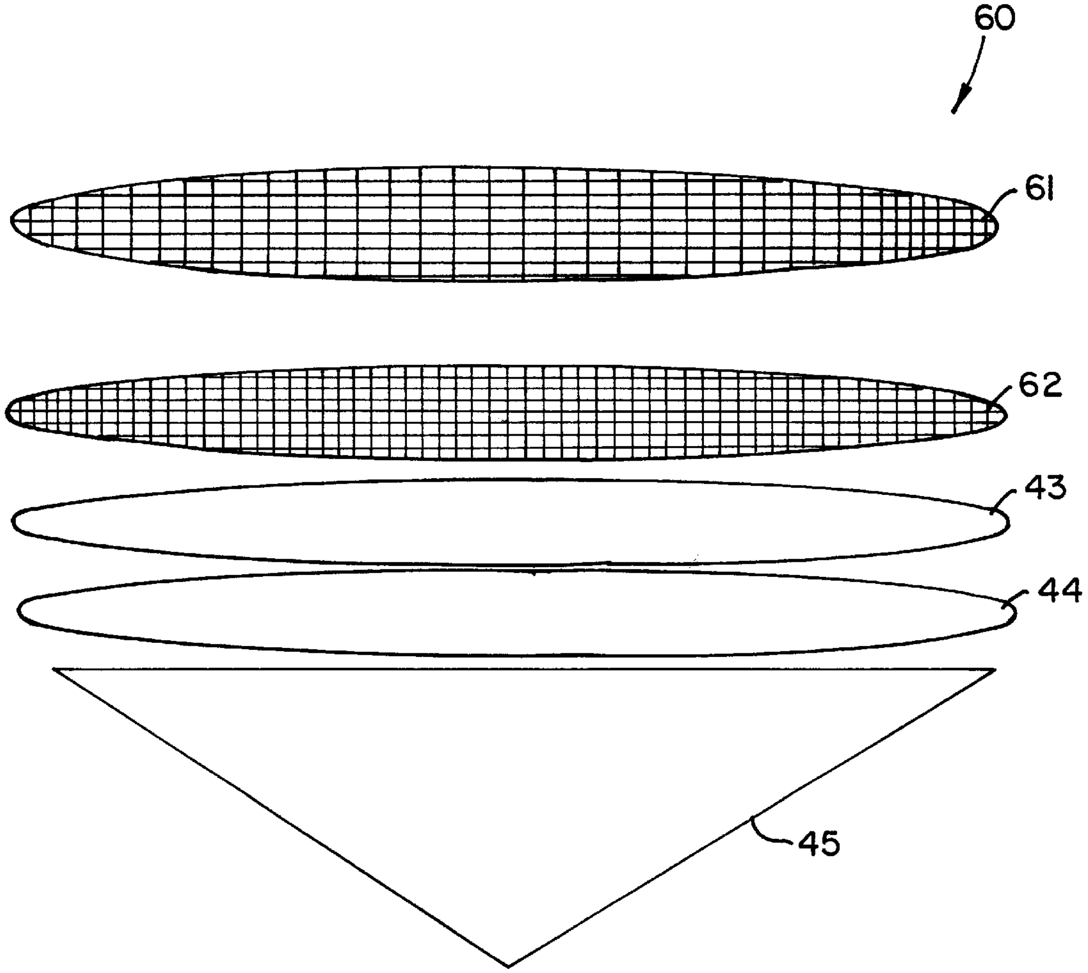
FIG. 2*b* is a schematic view of a forward trajectory secondary charged particle generator detector in accordance with the present invention.
Figure 2C:
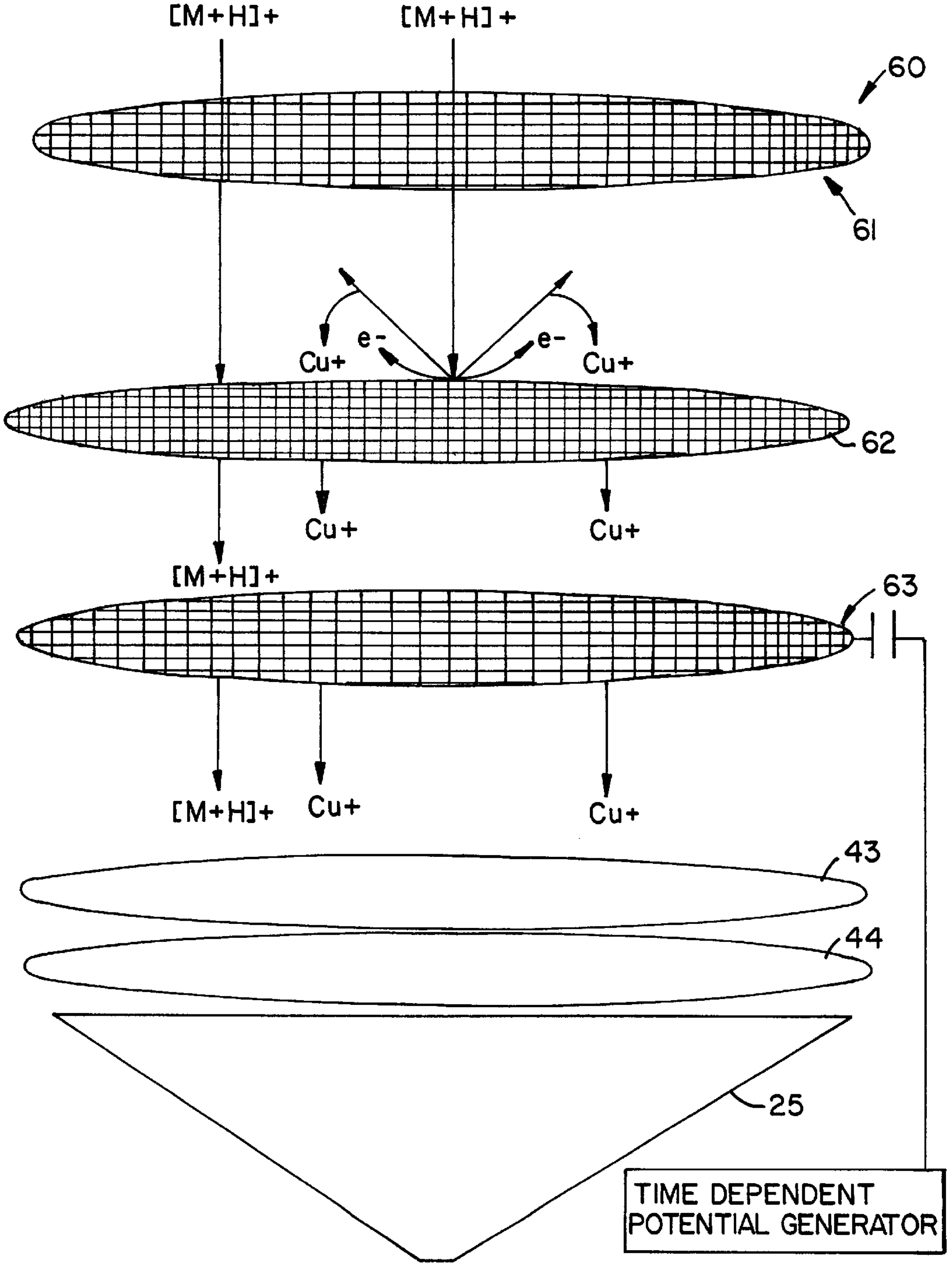
FIGS. 2*c* and 2*d* are schematic views of a forward trajectory discrete SCPG ion detector using different arrangements in accordance with the present invention.
Figure 2D:
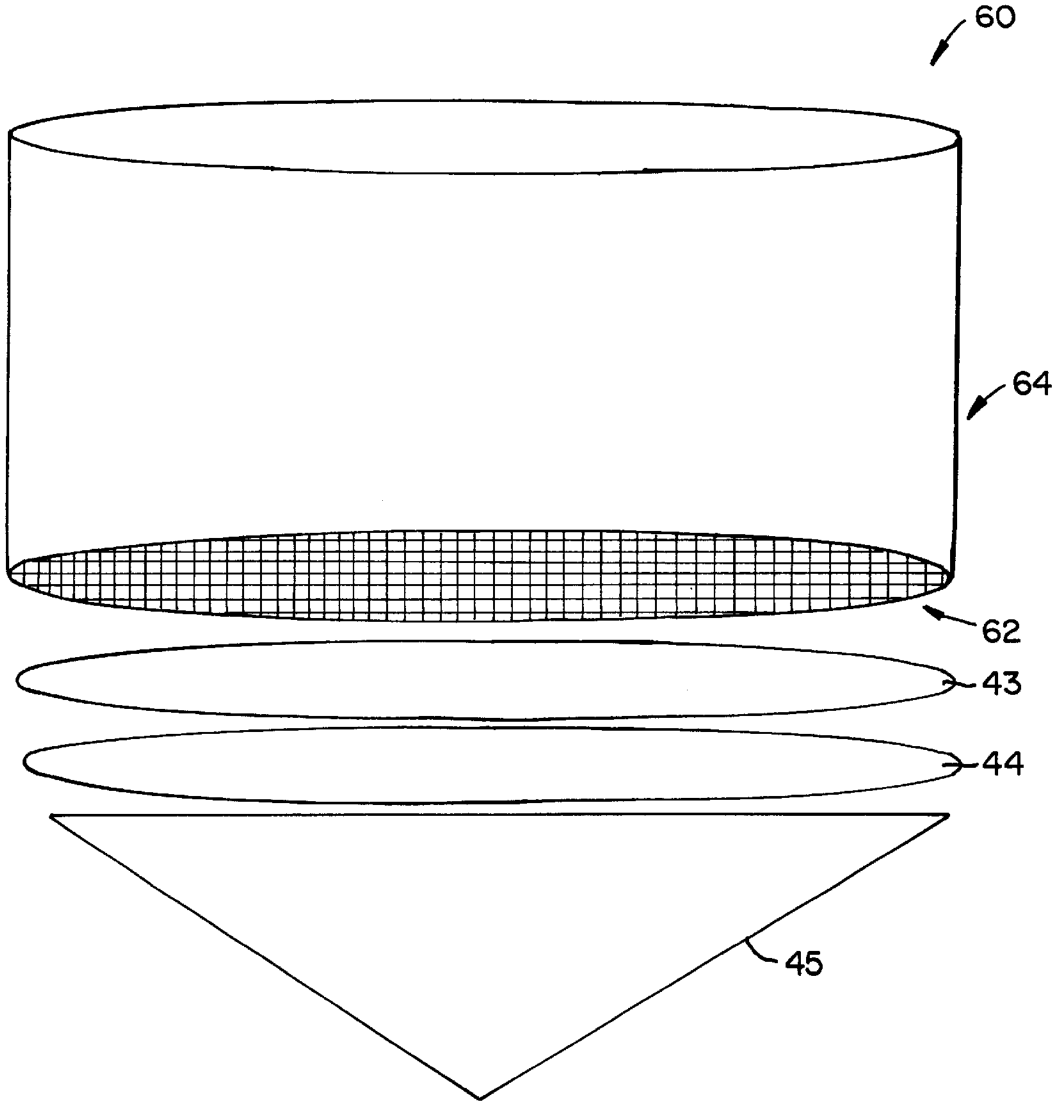

In another embodiment of this design, field retaining grid 61 is replaced with a field retaining tube 64 as illustrated in FIG. 2*d*. Field retaining tube 64 can be composed of a metal, electroconductive, non ferromagnetic material. Alternatively, it could be composed of a conductive plastic or non conductive material coated with a conductive polymer.

Both field retaining grid 61 and field retaining tube 64 are held at ground potential. They function to eliminate or attenuate the strength of any emitted, stray electrical fields generated by the SCPG 61, DAG 63, and MCP 43 and 44 surfaces which may adversely alter the trajectory of parent ions during flight within the mass spectrometer drift tube.

Figure 6:
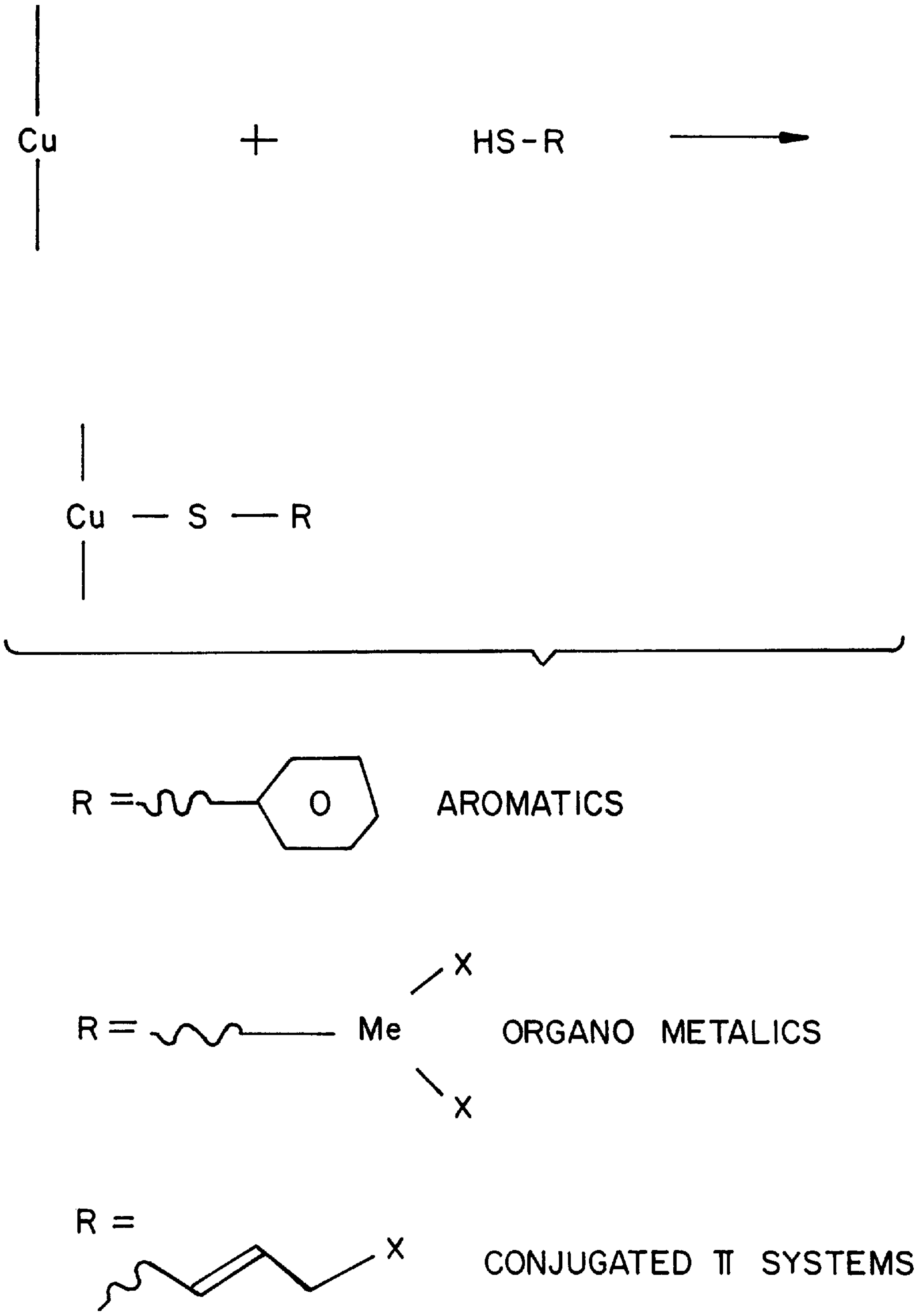
FIG. 6 depicts possible organic coatings as well as a means for covalent attachment of these organic coatings to a copper back bone.

Grid SCPG 62 is preferably of adequate line density so as to maximize the collision frequency of incident parent ions while simultaneously maximizing total parent ion and sputtered product transmission. Typical transmission efficiencies range from 30–70%. The grid is preferably composed of a material having high sputter efficiency or high sputter potential. The same previously identified metal such as but not limited to Cu, Au, Ag, Cd, Zn, Pb, and alloy mixtures of these metals could be used. Additionally, grid SCPG 62 could be coated with an ionic crystalline or polymeric covering along the engagement side that provides electrical conductivity and increased sputtering capacity. Furthermore, grid SCPG 62 could be composed of a metal skeleton in which organic materials of high sputter potential are covalently attached. Such materials include: aromatic compounds, conjugated pi system organic compounds, and organometallic compounds as noted in FIG. 6.

Sputter products of SCPG 62 primarily consist of electrons and sputtered SCPG metal neutrals. A minority of sputtered SCPG metal ions are released. If the aforementioned inorganic or organic coatings are utilized, a greater amount of sputtered ions will be liberated. Initial velocity of these sputtered products is dependent upon the incidence angle of the primary parent ion to the surface of SCPG 62. Those parent ions which graze the side of grid wires in SCPG 62, will create forward scattered sputtered products. Those which strike at angles approximating the normal to grid wires in SCPG 62 will produce back scattered or retrograde moving sputtered products. As angles deviate from the normal, initial back sputtered velocity is expected to approach zero in a cosine square manner as illustrated in FIG. 5. In all cases, the initial energy of these sputtered products are low (typically 5–20 eV).

Grid SCPG 62 is preferably biased at some negative potential ranging from −50 to −3000 volts. Such biasing improves the collision probability of primary ions by suppressing any strong field punch created by underlying MCP assembly 43 when high potentials in excess of negative 2 kV are applied to provide for post-acceleration of primary ions and SCP products into the conversion surface of MCP 43. Such field punch provides an accelerating field which preferentially directs incident ions away from the SCPG grid wires and into the space between them, defeating the purpose of the SCPG 62. Applying a negative bias to SCPG 62 flattens this field penetration, allowing ions on a collision course with SCPG 62 wires to maintain their original trajectories, thus increasing the probability of primary ion—SCPG wire collision.

Biasing SCPG 62 to some negative potential also promotes the emission of electrons. The emission of sputtered neutral products are not effected. Since the negatively biased SCPG 62 precedes MCP 43 whose impact surface is held at some high negative potential (typically −2 to −15 kV) exceeding that which is employed in biasing SCPG 62, both forward and back sputtered electrons are accelerated backwards in retrograde fashion. Consequently, these electrons are driven through the cloud of forward and back sputtered neutrals, thus ionizing them to sputtered metal ions through the mechanism of electron impact ionization. In this manner, ion converted back sputtered neutrals can now be accelerated by the field of negatively biased SCPG 62 to pass through SCPG 62 and strike the surface of the MCP 43, creating additional detection signal which enhances the sensitivity for high molecular weight ions.

In addition to ionizing sputtered neutrals, such retrograde electrons promote fragmentation of non incident and soon to be incident parent ions through the mechanism of electron impact. Since the m/z of these fragment ions are less than that for their large, primary ions, ion conversion efficiency is further increased.

Differential acceleration grid (DAG) 63 is positioned below SCPG 62. DAG 63 is a high transmission grid (greater than 80%) composed of metals of low sputter potential such as Ni and stainless steel. A high transmission grid with low sputter potential is favored in order to prevent the generation of fragment ions or secondary charged particles due to parent ion collision with DAG 63.

DAG 63 is used to mitigate the time of flight disparity between SCPG generated products and non-incident parent ions, improving detector mass resolving power. Such an arrangement is depicted in FIG. 2*c*. SCPG 62 created sputter products are generally much lower in MW than their incident ion or fragmentation ion counterparts. Consequently, acceleration produced within the field that exists between the SCPG 62 and MCP 43 often propels sputtered ion products past these other ions prior to striking the conversion surface MCP 43. Depending on the mass of the incident ion, the result can range from a front end distorted detection signal to the resolution of early arriving ion populations. Ions with MW less than 50 kDa can typically produce two or more measurable signals while heavier ions tend to have a single, front end distorted signal.

Such distortion of resolution could be avoided by placing a low acceleration potential between the SCPG 62 and the MCP 43, however doing so will greatly reduce the final energy of sputtered and fragmented SCPG products, thus reducing their electron conversion efficiencies at the surface of MCP 43. Additionally, the use of high strength post acceleration fields have also demonstrated improvements in non-incident parent ion detection conversion efficiency, further augmenting sensitivity for large mw ions. Thus it is advantageous to have strong acceleration fields between the SCPG 62 and the surface of MCP 43. Consequently, the use of DAG 63 is a preferred method to eliminate this problem.

To correct for such resolution distortion, an electrical potential is placed upon DAG 63 which establishes a field between the SCPG 62 and the DAG 63 which is significantly lower than that which would normally exist between the SCPG 62 and an MCP 43. In this manner sputtered product ions are not greatly accelerated. Because the initial energies of these sputtered product ions are low (measured to be less than 20 eV), they move slowly through this region. Non-incident parent ions and incident ions without significant energy loss, continue to move at high velocities through this region, passing the sputtered product ions. Once sputtered product ions pass DAG 63, they are then accelerated by the strong field existing between the DAG 63 and MCP 43. The DAG potential is selected so that post DAG 63 acceleration of sputtered ion and parent ion populations occurs in a manner so that sputtered product ions catch up with parent ion population at the point of impact upon the surface of MCP 43. In this manner, time spread is minimized and resolution is improved.

Because the degree of differential acceleration required to time compensate parent and sputtered product ions is mass dependent, the potential of DAG 63 must vary along with the mass of the incident ions. This can be achieved by the use of distinct DC DAG potentials so that scans are segmentally performed at different target mass ranges. However, this technique is somewhat cumbersome. A preferred solution is one in which DAG 63 is held at some constant DC potential and is capacitively coupled to an AC signal whose amplitude is time dependent. The time-dependent amplitude change of this AC signal is synchronized with the time of parent ion arrival at SCPG 62, so that the appropriate DAG potential is present during a given mw analysis time.

Such resolution correction works well for a majority of created secondary charge particles, however there still exists other ion populations whose mw or initial velocities are such so that they all can not all be focused to be coincident with parent ion upon the conversion surface of MCP 43. Thus, a fundamental limit to resolution enhancement or correction for this technique exists. Resolution degradation using the forward trajectory SCPG detector in this manner is observed during the analysis of compounds with molecular weights less than 10 kDa. Analytes detected in this mass range exhibit adequate conversion efficiencies upon the surface of MCP 43. Consequently, such sensitivity enhancement mechanisms are not required.

The forward trajectory SCPG detector can be switched into a high resolution mode by altering the potential of SCPG G2, DAG 63, and MCP 43. Both SCPG 62 and DAG 63 are set to an identical, slight positive bias (+50 to 100 volts). In this manner, the positive bias of these grids will exceed the electron work function, thus making the release of sputtered electrons improbable. Accordingly so, sputtered neutral products and intact parent ions will not collide with emitted electrons. In this manner, sputtered neutrals will not be ionized and incident parent ions will not be fragmented by electron impact. Furthermore, the isopotential field existing between SCPG 62 and DAG 63 will not provide any acceleration of sputter ion products toward the surface of MCP 43. The surface potential of MCP 42 is also reduced to be less than −2000 volts, creating a weak post-acceleration field. The latter eliminates possible time spreading due to post-acceleration of any secondary sputtered product, secondary fragmentation product, or metastable decay products of primary ion species. The aforedescribed configuration is capable of resolving isotopic species for analytes with molecular weights less than 3000 Da.

The forward trajectory SCPG detector can be automatically toggled between high resolution and high molecular weight/enhanced sensitivity modes by providing electronic or mechanical switching or voltage generation means to alter the aforementioned potentials depending upon desired mode of operation.

Microchannel plates 43 and 44 are thus held at high negative potentials (up to −15 kV) for high molecular weight sensitivity operation and at low potential (less than or equal to −2 kV) for high resolution measurements. In both cases, the negative potential of MCP 43 and 44 aid in the propagation of electrons to anode 25, which is preferably held at virtual ground.

Accordingly, the general operation of the forward trajectory ion detector operating in high molecular weight sensitivity mode involves primary ions 46 traveling through a field retaining grid 61 or field retaining tube 64. Parent ions strike SCPG 62, which is held at some slight negative bias potential, thus fragmenting into product ions, while simultaneously emitting sputtered electrons, sputtered neutral and sputtered ion products from SCPG 62. Emitted electrons ionize sputtered neutral products and further fragment parent ions by the mechanism of electron impact. A precise electrical potential is applied to DAG 63 by a capacitively coupled AC generator so that differential acceleration of SCPG 62 products and intact parent ion occurs. Such differential acceleration continues until SCPG 62 product ions and intact parent ions pass into the region established between DAG 63 and MCP 43. The established degree of differential acceleration insures that both intact parent ions and most sputtered products arrive at the conversion surface of MCP 43 at the same point in time. Subsequent electron emission cascades within MCP 43 and MCP 44 create an amplified flux of electrons which ultimately impinge upon detector anode 45. The current created at detector anode 46 is used to generate the detector signal.

The general operation of this detector in high resolution mode is essentially the same except that SCPG 62 and DAG 63 are held at some identical, slight positive bias and MCP 43 is held at negative potentials less than or equal to 2000 volts. In this configuration, electron emission by SCPG 62 is not favored and any sputtered product created by parent ion collision with SCPG 62 is not accelerated towards MCP 43. Furthermore, the weak post-acceleration field which exists between DAG 63 and MCP 43 is insufficient to adequately convert spurious fragment ions. The result is an efficient transmission and conversion of only parent molecular ions, creating a high resolution mode of operation.

As stated previously, it should be apparent to those skilled in the art that microchannel plates 43 and 44 could be replaced with some other electro-emissive detectors such as electron multipliers or hybrid combinations of microchannel plates and electron multipliers.

The ion detectors of this invention can be used in any device for detection of ions. For example, an ion desorption device need not include a timer to detect time-of-flight. Such devices spread out generated ions and allow their differentiation by the detector.

Accordingly, the present invention consists of two secondary charged particle generator detectors: the forward trajectory and reverse trajectory ion detectors. Both approaches provide means by which primary incident parent ions generate secondary products which, in turn, create additional signal, thus increasing the over all gain within the detection process. Such ion detector assemblies have increased sensitivity when compared to prior art devices.

Although the invention has been described with reference to specific exemplary embodiments, it will be appreciated that it is intended to cover all modifications and equivalents within the scope if the appended claims.

What is claimed is:

1. An reverse trajectory ion detector comprising:

a. an electrically shielded ion transporter that directs movement of primary ions along a primary direction of travel;

b. a secondary charged particle generator that generates secondary charged particles in response to primary ions from the transporter that engage the secondary charged particle generator;

c. an electro-emissive detector that generates electrons in response to secondary charged particles from the secondary charged particle generator and rebounding primary ion fragments that engage the electro-emissive detector, the electro-emissive detector being positioned to receive the secondary charged particles and rebounding primary ion fragments along a secondary direction of travel that is at least partially retrograde to the primary direction of travel; and d. means for detecting electrons generated by the electro-emissive detector and generating a signal.

2. The ion detector of claim 1 wherein the transporter comprises a tube coated with an electro-conductive material.

3. The ion detector of claim 1 wherein the transporter comprises a metal tube.

4. The ion detector of claim 3 further comprising a field retaining entrance grid surrounding the tube and wherein the tube includes a cone-shaped exit between the field retaining entrance grid and the secondary charged particle generator, the tube further including a lens ground grid within the tube between the field retaining entrance grid and an entrance of the tube.

5. The ion detector of claim 1 wherein the transporter comprises a cylindrical grid.

6. The changed particle detector of claim 1 wherein the secondary ion generator has an electrostatic potential that repels the secondary charged particles.

7. The ion detector of claim 1 wherein the secondary charged particles comprise electrons, protons, copper ions and copper neutrals.

8. The ion detector of claim 1 wherein the secondary charged particles comprise at least one of gold, silver, nickel, and copper alloy or metals with emitted ions, electrons, protons, and/or neutrals.

9. The ion detector of claim 1 wherein the secondary charged particle generator comprises a non-permeable foil.

10. The ion detector of claim 1 wherein the secondary charged particle generator comprises a permeable foil.

11. The ion detector of claim 1 wherein the secondary charged particle generator comprises a solid disk covered with a metal on an engagement side of the disk.

12. The ion detector of claim 1 wherein the secondary charged particle generator comprises a solid disk covered with a metal alloy on an engagement side of the disk.

13. The ion detector of claim 1 wherein the secondary charged particle generator comprises a low transmission grid.

14. The ion detector of claim 1 wherein the secondary charged particle generator comprises a high transmission grid.

15. The ion detector of claim 1 wherein the secondary charged particle generator comprises an inert skeleton covered along at least an engagement side with a metal, inorganic, organic or mixture thereof coating that provides electrical conductivity and has sputtering capability.

16. The ion detector of claim 1 wherein the secondary charged particle generator includes a concave focusing element that functions to disbursely direct the secondary charged particles to engage the electro-emissive detector.

17. The ion detector of claim 1 wherein the electro-emissive detector comprises a first microchannel plate.

18. The ion detector of claim 17 wherein the electro-emissive device comprises a second microchannel plate that generates electrons in response to electrons generated by the first microchannel plate that engage the second microchannel plate.

19. The ion detector of claim 1 wherein the electro-emissive detector comprises an electron multiplier.

20. The ion detector of claim 1 wherein the electro-emissive detector comprises a microchannel plate and an electron multiplier.

21. The ion detector of claim 1 further comprising a field retaining entrance grid between the secondary charged particle generator and the at least one electro-emissive detector.

22. A method of detecting ions comprising the steps of:

a. directing primary ions along a direction of travel to a secondary charged particle generator;

b. engaging the primary ions with the secondary charged particle generator and thereby creating secondary charged particles;

c. repelling the secondary charged particles from the secondary charged particle generator toward an electro-emissive detector along a direction of travel at least partially retrograde with respect to the direction of travel of the primary ions;

d. engaging the secondary charged particles with the electro-emissive detector to thereby release electrons; and e. detecting the electrons and generating a signal in response thereto.

23. A forward trajectory ion detector apparatus comprising:

a. a field retaining grid that directs primary ions along a direction of travel into the detector apparatus;

b. a grid secondary charged particle generator that generates secondary products, including sputtered electrons, protons, ions, neutral species, and primary ion fragments in response to primary ions that pass through the field retaining grid and engage the secondary charged particle generator, the secondary charged particle generator being held at an electrical potential with respect to instrument ground;

c. an electro-emissive detector that generates electrons in response to secondary products from the secondary charged particle generator and primary ions that engage a conversion surface of the electro-emissive detector; and d. means for detecting electrons generated by the electro-emissive detector and generating a signal in response thereto.

24. The ion detector of claim 23 further comprising a differential acceleration grid that differentially accelerates primary ions and secondary products such that a majority of them arrive at the conversion surface of an electro-emissive detector at the same point in time.

25. The ion detector of claim 23 wherein the field retaining grid comprises a high transmission grid that is composed of a metal or electro-conductive material with low sputter potential.

26. A forward trajectory ion detector apparatus comprising:

a. a field retaining tube that directs primary ions along a direction of travel into the detector apparatus;

b. a grid secondary charged particle generator that generates secondary products, including sputtered electrons, protons, ions, neutral species, and primary ion fragments in response to primary ions that pass through the field retaining tube and engage the secondary charged particle generator, the secondary charged particle generator being held at an electrical potential with respect to instrument ground;

c. an electro-emissive detector that generates electrons in response to secondary products from the secondary charged particle generator and primary ions that engage a conversion surface of the electro-emissive detector; and d. means for detecting electrons generated by the electro-emissive detector and generating a signal in response thereto.

27. The ion detector of claim 26 wherein the field retaining tube comprises one of a metal, electro conductive polymer, non conductive polymer or a ceramic covered with an electro conductive coating.

28. The ion detector of claim 23 wherein the secondary charged particle generator grid comprises one of copper, cadmium, silver, lead, zinc, gold, or an alloy of high sputter potential.

29. The ion detector of claim 23 wherein the secondary charged particle generator grid comprises a non-conductive skeleton that is coated with an electroconductive coating of high sputter potential.

30. The ion detector of claim 28 wherein an organic aromatic compound is covalently linked to a metal grid back bone creating a contiguous coating on at least an ion engagement side of the secondary charged particle generator.

31. The ion detector of claim 28 wherein an organometallic compound is covalently linked to a metal grid back bone creating a contiguous coating on at least an ion engagement side of the secondary charged particle generator.

32. The ion detector of claim 28 wherein an organic polymer containing conjugated pi systems is covalently linked to a metal back bone creating a contiguous coating on at least an ion engagement side of the secondary charged particle generator.

33. The ion detector of claim 23 wherein the secondary charged particle generator is held at a positive electrical potential with respect to instrument ground.

34. The ion detector of claim 23 wherein the secondary charged particle generator is held at a negative electrical potential with respect to instrument ground.

35. The ion detector of claim 24 wherein the differential acceleration grid comprises a high transmission arrangement of grid elements composed of materials having low sputter potential.

36. The ion detector of claim 24 wherein the differential acceleration grid is held at distinct DC electrical potentials at different instrument duty cycle times to allow for temporal focusing of parent ions and secondary products upon the conversion surface of the electro-emissive detector.

37. The ion detector of claim 24 wherein the differential acceleration grid is held at different electrical potentials by a combination of a DC offset and capacitively coupled AC signal such that the differential acceleration properties of this arrangement are continuously altered as a function of scan time.

38. The ion detector of claim 37 wherein a signal generator is directly coupled to the differential acceleration grid to create time dependent differential post acceleration.

39. The ion detector of claim 23 wherein the electro-emissive detector comprises a first microchannel plate.

40. The ion detector of claim 39 wherein the electro-emissive device comprises a second microchannel plate that generates electrons in response to electrons generated by the first microchannel plate that engage the second microchannel plate.

41. The ion detector of claim 23 wherein the electro-emissive detector comprises an electron multiplier.

42. The ion detector of claim 23 further comprising means for automatically switching between strong and weak electrical field creation between the secondary charged particle generator and electro-emissive device.

43. The ion detector of claim 24 further comprising means for automatically switching between strong and weak electrical field creation between the differential acceleration grid and electro-emissive device.

* * * * *